United States Patent [19]
Lewis

[11] Patent Number: 6,128,409
[45] Date of Patent: Oct. 3, 2000

[54] SYSTEMS AND METHODS FOR HANDPRINT RECOGNITION ACCELERATION

[75] Inventor: Russell F. Lewis, Dallas, Tex.

[73] Assignee: Texas Instruments Incorporated, Dallas, Tex.

[21] Appl. No.: 07/792,534

[22] Filed: Nov. 12, 1991

[51] Int. Cl.[7] ........................................... G06F 9/00
[52] U.S. Cl. .................... 382/187; 382/188; 382/202
[58] Field of Search .................................. 382/3, 13, 54, 382/34, 24, 122, 181, 187, 188, 189, 202, 218

[56] References Cited

U.S. PATENT DOCUMENTS

| | | | |
|---|---|---|---|
| 4,015,239 | 3/1977 | Fujimoto | 382/24 |
| 4,028,674 | 6/1977 | Chuang | 382/3 |
| 4,128,829 | 12/1978 | Herbst et al. | 382/3 |
| 4,211,927 | 7/1980 | Hellstrom et al. | 250/445 T |
| 4,736,445 | 4/1988 | Gunersen | 382/13 |
| 4,794,451 | 12/1988 | Suzuki et al. | 358/96 |
| 4,843,026 | 6/1989 | Ong et al. | 437/51 |
| 4,953,226 | 8/1990 | Matsuyama | 382/13 |
| 5,038,382 | 8/1991 | Lipscomb | 382/13 |
| 5,054,569 | 10/1991 | Scott et al. | 180/167 |
| 5,113,452 | 5/1992 | Chatani et al. | 382/13 |
| 5,113,453 | 5/1992 | Simon | 382/24 |
| 5,177,793 | 1/1993 | Murai | 382/13 |
| 5,191,622 | 3/1993 | Shojima | 382/13 |
| 5,265,174 | 11/1993 | Nakatsuka | 382/13 |

FOREIGN PATENT DOCUMENTS

| | | |
|---|---|---|
| 0191407 | 8/1986 | European Pat. Off. . |
| 0377129 | 7/1990 | European Pat. Off. . |
| WO89/05494 | 6/1989 | WIPO . |

OTHER PUBLICATIONS

Proceedings of the 10th International Conference on Pattern Recognition, vol. 1, Jun. 21, 1990, Atlantic City, New Jersey, USA, pp. 460–463 XP000166347 Plamondon R., Nouboud F. On–Line Character Recognition System Using A String Comparison Processor.

*Primary Examiner*—Yon J. Couso
*Attorney, Agent, or Firm*—W. Daniel Swayze, Jr.; W. James Brady, III; Frederick J. Telecky, Jr.

[57] ABSTRACT

A data processing system 10 is illustrated including an HPR input device 12 coupled to an HPR accelerator system 14. A general purpose processor 16 receives conventional character data from the HPR accelerator system 14 which translates raw input data received from the HPR input device 12. The general purpose processor 16 may be further coupled to a memory 18 and display 20 and other I/O systems 22. The incorporation of an HPR accelerator system 14 in data processing system 10 allows for the handprint recognition function to be accomplished in the background of the overall operation of the data processing system 10.

6 Claims, 1 Drawing Sheet

SYSTEMS AND METHODS FOR HANDPRINT RECOGNITION ACCELERATION

TECHNICAL FIELD OF THE INVENTION

This invention relates in general to the field of electronic systems and more particularly to improved systems and methods for handprint recognition.

BACKGROUND OF THE INVENTION

Attempts to make portable data processing systems smaller have been limited by the size of the standard keyboard as an input device. In order to create still smaller portable systems, electronics designers have developed handprint recognition systems (HPR systems). These systems are designed to recognize handprinted characters and to translate them into character data recognizable by conventional applications programs. A variety of input devices have been developed such as digital touch pads, electrostatic and electromagnetic pens, current injection pens, and the like. All these devices are capable of sensing handprinted characters and outputting digital data to a processor. The processor must then receive the data to the input device and translate it into conventional character data that can be used by applications programs such as spread sheets, word processing programs, and the like.

A wide variety of HPR algorithms have been developed that can accurately and efficiently perform the recognition and translation function in a general purpose processor. However, the real time recognition of handwriting is a computationally intensive activity for a general processor. The recognition process involves a series of steps for each stroke performed by the user of the system which essentially ties up all of the processing capability of the processor performing the recognition algorithm. Accordingly, the processor is not free to perform any other tasks while the user of the system is inputting handwritten information. The complexity of the recognition process differentiates handprinted input from other, more conventional, forms of input such as keyboard entries. In keyboard entries, a general purpose processor can quickly ascertain the character being input and can perform other tasks while the keyboard data entry process is proceeding.

Accordingly, a need has arisen for a data processing system which incorporates a handprint recognition accelerator system to perform the handprint recognition process in the background mode and supply a general purpose processor with conventional character data.

SUMMARY OF THE INVENTION

In accordance with the teachings of the present invention, a data processing system is disclosed that substantially eliminates or reduces disadvantages with prior art handwriting recognition systems.

The system of the present invention comprises a handprint recognition accelerator system operable to receive handprint data from a handprint recognition input device. The handprint recognition accelerator system is further operable to output conventional character data to a general purpose such that the general purpose processor need not be occupied with the handprint recognition function.

BRIEF DESCRIPTION OF THE DRAWINGS

A more complete understanding of the present invention may be acquired by referring to the detailed description and claims when considered in connection with the accompanying drawings in which like reference numbers indicate like features and wherein:

DETAILED DESCRIPTION OF THE INVENTION

Figure 1:
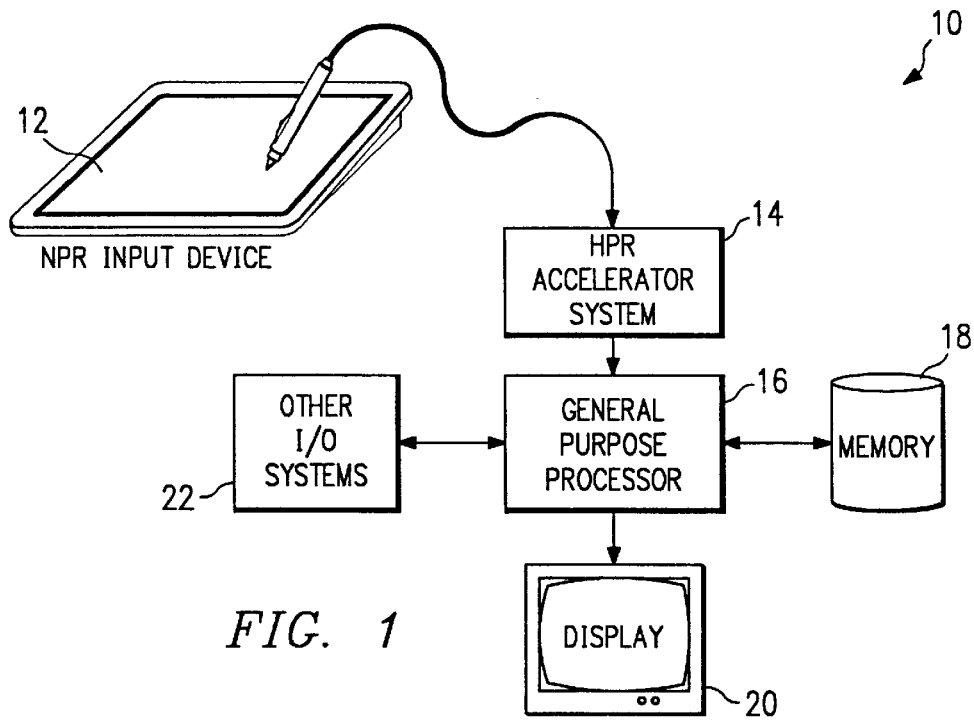
FIG. 1 is a schematic block diagram of a data processing system constructed according to the teachings of the present invention.

Referring to FIG. 1, a data processing system 10 is illustrated which comprises an HPR input device 12 coupled to an HPR accelerator system 14. HPR input device 12 may comprise one of any number of digitizing sources such as electrostatic, electromagnetic, or current injection pens, styluses, resistive pads, pressure pads, or the like which are all operable to receive manually inputted handwritten characters and output digital data representing the series of points activated by the user of the HPR input device 12 as the handprinted characters are written on the device 12.

A variety of operations must be performed on the raw input data output from HPR input device 12 before the characters input by a user of system 10 may be used in an application program such as a word processing program or a spread sheet program. The raw digital data output by device 12 must be cleaned or "thinned" to eliminate spurious points created by inaccuracies in the manual interface contained within input device 12. The cleaned and thinned data is then converted to vector stroke data. Each character is a combination of one or more of these vector strokes. The combination of vector strokes must be matched against a library or libraries of sample collections of strokes to determine the character that was intended to be input by the user of the system 10. This continuous process of collection of data, cleaning and thinning of the data, conversion of the data to vector stroke data and matching of the vector stroke in sample libraries must ideally be accomplished in real time as the user is inputting characters on the HPR input device 12. This process is a computationally intensive process which, in prior art systems, requires the undivided attention of a general purpose processor such as the Intel 386 chip or the like.

According to the teachings of the present invention, the real time recognition function described previously is performed by HPR accelerator system 14 which then outputs a stream of conventional character data to a general purpose processor 16. The character data may be in any of a variety of conventional formats such as ASCII character coding. The general purpose processor 16 is thus supplied with character data that can be directly used in application programs and is not required to occupy valuable processor time with the handprint recognition process described previously.

The general purpose processor 16 is shown in FIG. 1 to be coupled to a memory 18 which may comprise any number of internal or external memory systems such as tape drives, hard drives, RAM, or the like. The general purpose processor 16 is also shown to be coupled to a display 20 which may be a visual monitor or other conventional means of displaying graphic or character data to users of the system 10. The general purpose processor 16 of data processing system 10 may also be coupled to other input/output (I/O) systems 22 which may comprise conventional keyboards, printers, network, cards, modems, or the like.

Prior art systems have relied on the processing power of a general purpose microprocessor to complete the handprint recognition function and have thus greatly slowed the overall operation of the systems. According to the teachings of the present system, the HPR accelerator system 14 is used to translate the raw data received from an HPR input device 12 into recognizable character data ready to be used by general purpose processor 16 allowing the general purpose processor 16 to continue operation in an efficient multi-tasking environment.

Figure 2:
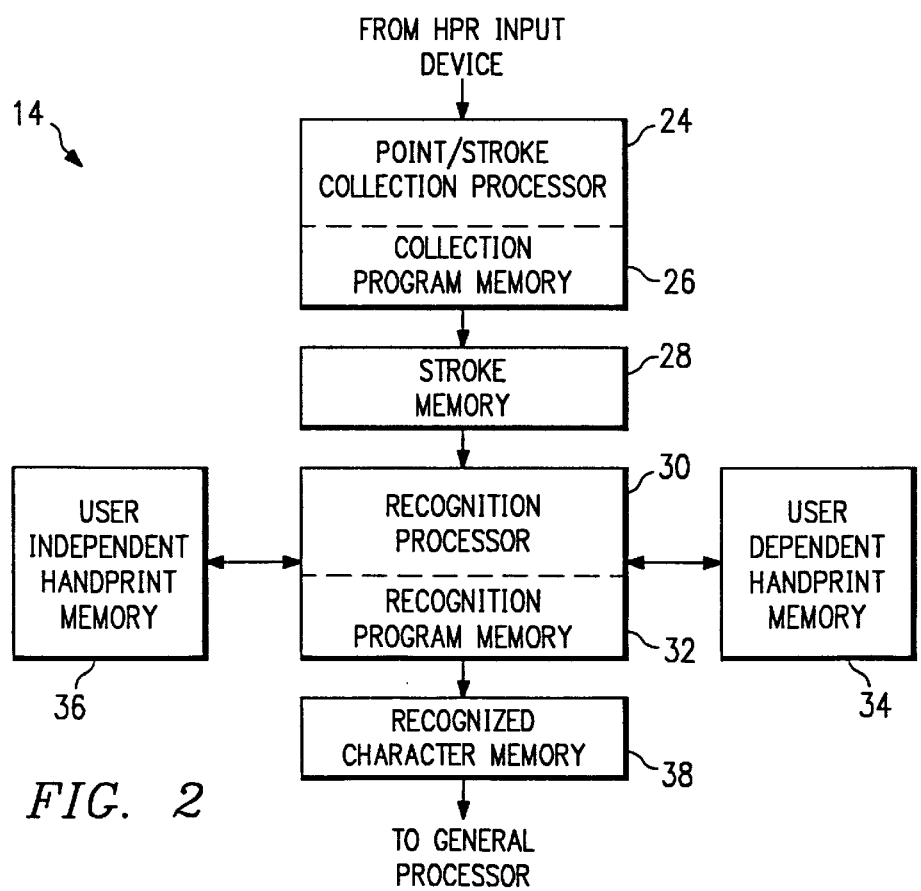
FIG. 2 is a schematic block diagram of a handprint recognition accelerator system constructed according to the teachings of the present invention.

Referring to FIG. 2, one embodiment of the HPR accelerator system 14 is illustrated. HPR accelerator system 14 is shown in FIG. 2 to comprise a point/stroke collection processor 24 that comprises a collection program memory 26 operable to store collection programs used by the collection processor 24. The collection processor 24 may comprise an eight or sixteen bit digital processor similar to the TMS 370 family of digital processors sold and manufactured by Texas Instruments Incorporated. The collection processor 24 is operable to receive the digital data indicating the series of points activated on the HPR input device 12. The collection processor 24 is further operable to clean and thin the set of data points and convert the points to vector stroke data. The vector stroke data is then output to a stroke memory 28.

The programs necessary for the functions described of the collection processor 24 are stored in collection program memory 26 which may comprise, for example, on the order of five kilobytes to twenty kilobytes of program memory. Collection program memory 26 may comprise random access memory or EEPROM memory.

An important technical advantage of the present invention inheres in the fact that the collection processor 24 comprises a general purpose processor which is completely programmable to allow for a wide variety of data input formats from a wide variety of HPR input devices 12. The program stored in collection program memory 26 could be programmed in the manufacture of system 14 using conventional EEPROM technology. In the alternative, collection program memory 26 may comprise random access memory operable to receive new collection programs to allow for new input devices with differing data input formats. In any case, collection processor 24 is operable to receive data in a variety of input formats and output stroke data in a format recognizable by the remainder of the accelerator system 14.

Stroke memory 28 comprises a buffer for temporary storage of the vector stroke data and may comprise on the order of one hundred to five hundred bytes of random access memory.

The vector stroke data stored in stroke memory 28 is output as needed to a recognition processor 30 which utilizes recognition programs stored in a recognition program memory 32. The recognition processor 30 may comprise, for example, a processor similar to a sixteen or thirty-two bit digital processor of the TMS 320 E17 line of digital signal processors sold and manufactured by Texas Instruments Incorporated. The recognition processor 30 may use known recognition algorithms to compare the vector stroke data received from stroke memory 28 to libraries of known stroke data stored in user dependent handprint memory 34 or user independent handprint memory 36. The stroke data may comprise conventional characters and numbers as well as specially defined gestures, shorthand symbols and the like indicating defined functions.

User dependent handprint memory 34 may comprise on the order of seven to eight kilobytes of random access memory for the printed characters, numbers, gestures, and shorthand or other special symbols or on the order of one hundred kilobytes of memory for cursive characters. Using known methods, a user of data processing system 10 can train the system to recognize the user's own handwriting by loading a set of recognized characters into user dependent handprint memory 34 prior to operation of the system 10.

User independent handprint memory 36 may comprise on the order of fifty kilobytes of random access memory holding a variety of samples of handprinted characters, gestures, and shorthand or other special symbols. Recognition program memory 32 may comprise on the order of twenty kilobytes of program memory for conventionally printed material or on the order of 256 kilobytes of program memory to hold programs operable to recognize cursive characters. As described previously with reference to collection program memory 26, recognition program memory 32 may comprise random access memory or a EEPROM system. In this manner, recognition program memory could be programmable in manufacture to contain predetermined recognition programs using EEPROM technology. In the alternative, recognition program memory may comprise random access memory to allow it to receive new recognition programs as different recognition algorithms are developed or required depending upon a particular application or new use of HPR accelerator system 14. Recognition processor 30 is operable to compare the vector stroke data received from stroke memory 28 and to output a digitally coded character in a format recognizable by the general purpose processor 16. The data representing the recognized character is output to a recognized character memory 38 which may comprise on the order of 100 bytes of random access memory to act as a buffer between the recognition processor 30 and the general processor 16. According to an alternate embodiment of the present invention, the recognized character memory 38 may be sized substantially larger and may be used to store a bit map of a large number of recognized characters. This data can be stored for later downloading into a character processing system. In this manner, the handprint accelerator system 14 may comprise a portable system operating independently to receive character data for later processing. Such a portable system might be used for hand editing of ASCII text that may be incorporated in the ASCII text file when the edit characters are downloaded from the recognized character memory 38 to the processor performing the word processing function. Various conventional compression methods may be used to compress the bit map of the recognized characters prior to storage in the recognized character memory 38.

In an alternate embodiment of the present invention, HPR accelerator system 14 may comprise a plurality of recognition processors 30, each operating in parallel on vector stroke data received from stroke memory 28. The use of a plurality of parallel recognition processors 30 allows for the parallel use of different recognition algorithms on the same stroke data. Further, the use of parallel recognition processors 30 allows for the parallel comparison of a single set of stroke data to different character memories such as memories 34 and 36 illustrated in FIG. 2. A single memory may also be subdivided and used by parallel processors 30. Further, the use of parallel recognition processors 30 may combine the two previously described techniques and allow for the use of differing algorithms on differing libraries. The use of parallel recognition processors allows for the optimization of a particular recognition algorithm with a particular type of character data. Further, the use of parallel recognition processors allows for an increase in the amount of character memory scanned for each character input thereby increasing the speed of operation and accuracy of the data processing system 10. In general, the various libraries are configurable by the particular recognition program used.

The data output by the HPR accelerator system 14 may comprise a conventional ASCII character code. In alternate embodiments of the present invention, the data output by the HPR accelerator system 14 may comprise on the order of sixteen or more bits of parallel information to allow for larger character sets and the encoding of system defined and user defined shorthand characters which do not presently appear in conventional character sets. Due to the programmable nature of the recognition processor 30 as well as the collection processor 34, the HPR accelerator system 14 is adaptable to a wide variety of input devices 12 and general purpose processor 16. By altering the programs used to operate the collection processor 24 and the recognition processor 30, virtually any format of input data and output data can be used and generated, respectively, by the HPR accelerator system 14.

According to one embodiment of the present invention, the circuitry described in FIG. 2 as comprising HPR accelerator system 14 may all be formed on a single semiconductor substrate to allow for a monolithic HPR accelerator system. The collection processor 24 and recognition processor 30 may be constructed on a single semiconductor substrate using known methods. The quantities of program and data storage memory described previously may also be located on the single semiconductor substrate using known methods. It should be understood that the class of processors described previously, namely the TMS 320 and TMS 370 classes of processor manufactured by Texas Instruments Incorporated are merely described for the purposes of illustrating the present invention and should not be construed to limit the scope of the present invention to these or any particular general purpose processor. Further, it should be understood that the incorporation of the recognition processor and collection processor in a monolithic system would also allow for and entail the elimination of a large amount of circuitry within the general purpose processors. The particular general purpose processors described previously comprise a large amount of I/O circuitry and control signals which would not be necessary if the processors were incorporated in a monolithic system. The elimination of these circuitries may be accomplished using known methods in the art. The incorporation of the HPR accelerator system 14 in a monolithic system allows for the use of the HPR accelerator system in extremely small systems such as calculators, pocket computers, or pens.

Although the present invention has been described in detail, it should be understood that various changes, substitutions, and alterations can be made without departing from the spirit and scope of the invention as defined by the appended claims.

What is claimed is:

1. A data processing system, comprising:
a handprint input device operable to output first data representing handwritten information input by a user of the system;
an accelerator system coupled to said handprint input device and operable to receive said first data from said handprint input device and output second data representing recognizable characters; and
a general processor coupled to said accelerator system and operable to receive and use said second data;

wherein said accelerator system comprises:
a collection processor operable to receive said first data, to convert said first data into vector stroke data and to output said vector stroke data;
a user independent handprint memory operable to store user independent handwriting samples; and
a recognition processor coupled to said user independent handprint memory and operable to receive said vector stroke data, and to compare said vector stroke data to said samples and output said second data based on the results of said comparisons, and wherein said accelerator system further comprises:
a first handprint memory coupled to said recognition processor and operated to store at least a portion of said library data of said recognition processor;
a stroke memory coupled to said collection processor and said recognition processor and operable to store said vector stroke data prior to processing in said recognition processor; and
a recognized character memory coupled to said recognition processor and operable to store said second data output by said recognition processor; and wherein said accelerator system further comprises:
a user dependent handprint memory coupled to said recognition processor and operable to store samples of handwriting of said user;
a second handprint memory coupled to said recognition processor and operable to store portions of said library data of said recognition processor, said recognition processor operable to compare said vector stroke data to library data stored in both said user independent and user dependent handprint memories.

2. The data processing system of claim 1, wherein said recognition processor comprises first and second parallel recognition processors, each of said first and second parallel recognition processors operable to receive said vector stroke data from said collection processor.

3. The data processing system of claim 2, wherein said first parallel recognition processor is coupled to said first handprint memory and is operable to compare said vector stroke data to said samples stored in said user dependent handprint memory and said second parallel recognition processor is coupled to said second handprint memory and is operable to compare said vector stroke data to said samples stored in said user independent handprint memory.

4. A handprint recognition accelerator system operable to receive input data from a handprint input device and to output recognized character data, the handprint recognition accelerator system comprising:
a collection processor operable to receive said input data, to convert said input data into vector stroke data and to output said vector stroke data;
a user independent handprint memory operable to store user independent character samples; and
a recognition processor operable to receive said vector stroke data, compare said vector stroke data to said user independent character samples and output said recognizable character data based on the results of said comparisons; and wherein said handprint recognition accelerator system further comprises:
a stroke memory coupled to said collection processor and said recognition processor and operable to store said vector stroke data prior to processing in said recognition processor; and a recognized character memory coupled to said recognition processor and operable to store said second data output by said recognition processor, and wherein said handprint recognition accelerator system further comprises:

a user dependent handprint memory coupled to said recognition processor and operable to store user dependent character samples, said recognition processor operable to compare said vector stroke data to samples stored in both said user independent and user dependent handprint memories.

5. The handprint recognition accelerator system of claim 4, wherein said recognition processor comprises first and second parallel recognition processors, each of said first and second parallel recognition processors operable to receive said vector stroke data from said collection processor.

6. The handprint recognition accelerator system of claim 5, wherein said first parallel recognition processor is coupled to said user independent handprint memory and is operable to compare said vector stroke data to said samples stored in said user independent handprint memory and, wherein said second parallel recognition processor is coupled to said user dependent handprint memory and is operable to compare said vector stroke data to said samples stored in said user dependent handprint memory.

\* \* \* \* \*